A. LIEN.
BAND SAW GUIDE.
APPLICATION FILED MAR. 27, 1917.
1,263,443.
Patented Apr. 23, 1918.
2 SHEETS—SHEET 1.
Fig.1.
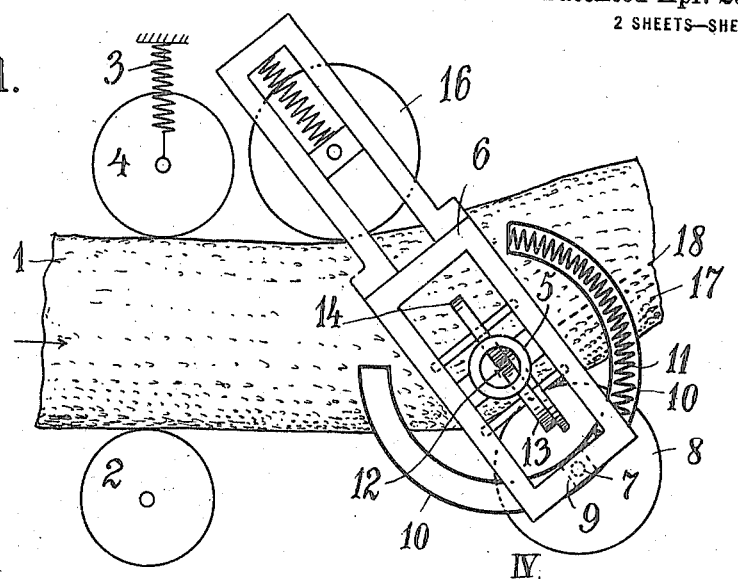
Fig.2.
Fig.3.
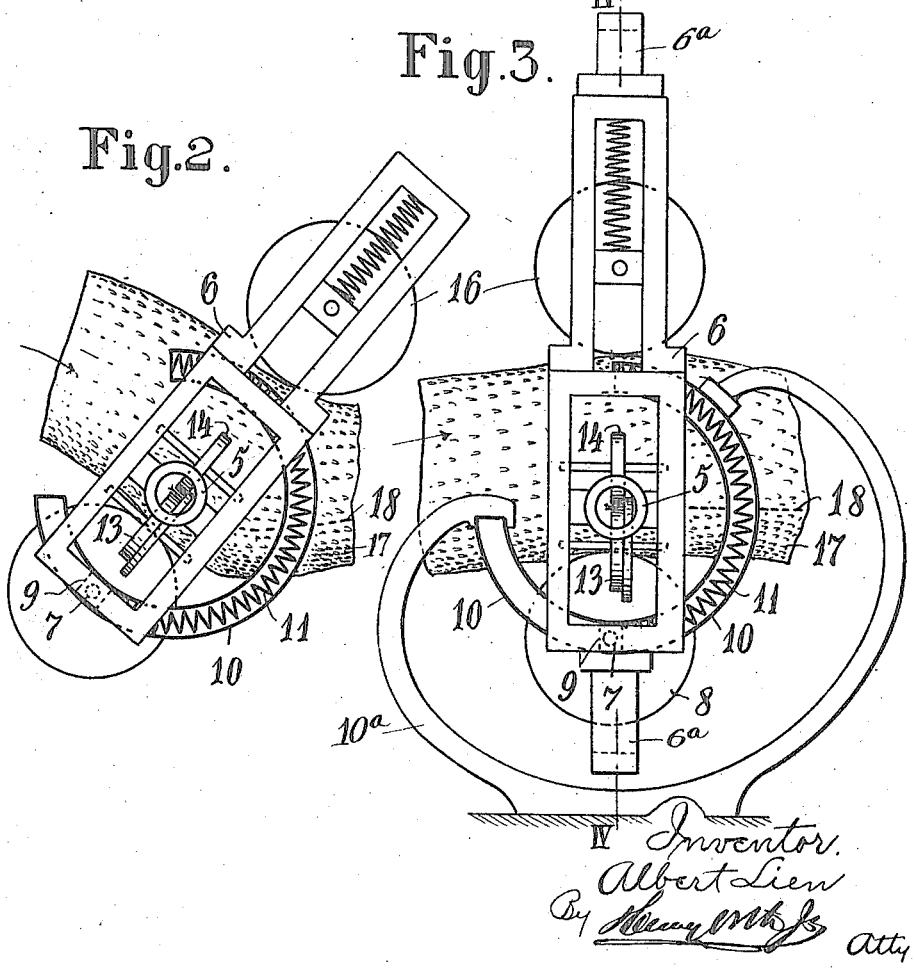
Inventor.
Albert Lien
By
Atty

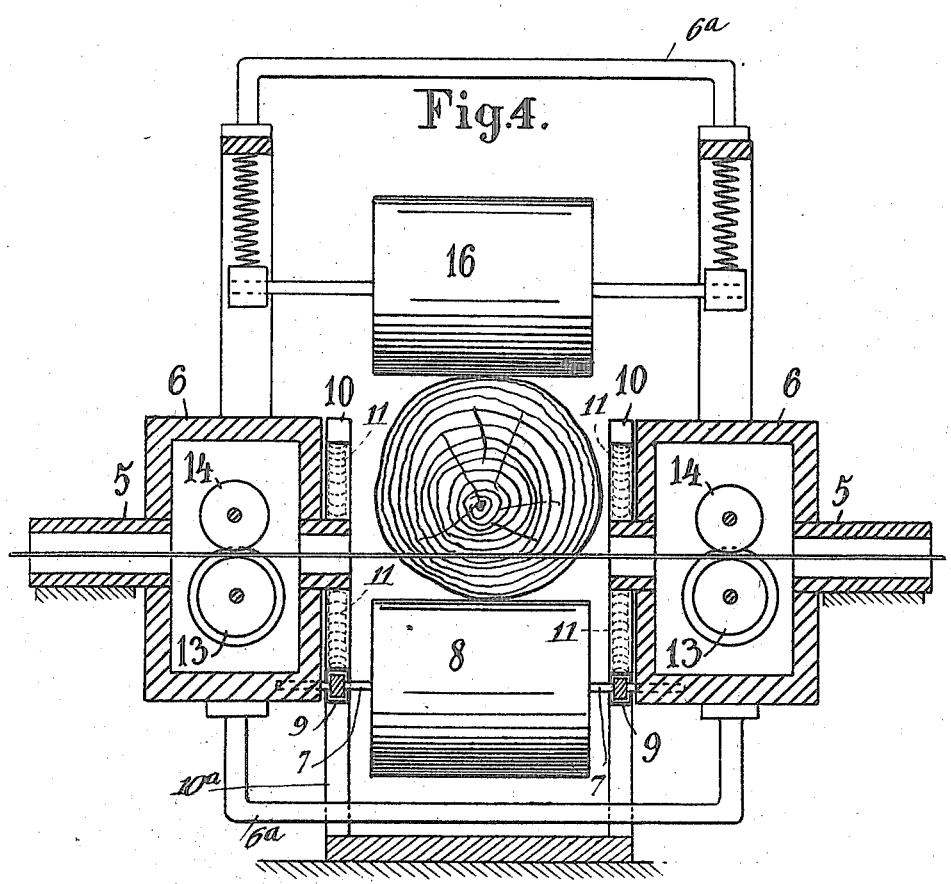

UNITED STATES PATENT OFFICE.

ALBERT LIEN, OF BERGEN, NORWAY.

BAND-SAW GUIDE.

1,263,443.

Specification of Letters Patent.

Patented Apr. 23, 1918.

Application filed March 27, 1917. Serial No. 157,810.

*To all whom it may concern:*

Be it known that I, ALBERT LIEN, a subject of the King of Norway, residing at Bergen, in the Kingdom of Norway, have invented certain new and useful Improvements in Band-Saw Guides; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a mechanism for controlling and adjusting the position of a saw blade especially for use in machines for the production of barrel hoops, and comprises a pivoted holder for the saw, said holder being adjusted by means of two rollers, which are in contact with the outside surface of the blank in such a way that the saw is always kept in a position parallel to that of the outside surface of the blank, even if this is very crooked.

A form of the invention is illustrated on the drawing, wherein Figures 1 to 3 show the saw adjusting mechanism in three different positions.

Fig. 4 shows a section on the line IV—IV on Fig. 3.

The blank 1 is kept in contact with the fixed roller 2, by the roller 4, which is under the influence of the spring 3. One or both of the rollers may be driven in order to feed the blank forward.

The saw adjusting mechanism is arranged behind these rollers and comprises two frames 6 spaced apart to permit the material to be passed between them. These frames are provided with hollow pivots 5 by means of which they are pivotally supported in a suitable framing (not shown) and they are rigidly connected at their upper and lower ends by cross rods 6ª so that both frames will swing in unison. In the lower ends of the frames 6 is mounted a shaft 7 carrying a roller 8 and at both ends of the roller the shaft extends through bearing blocks 9. These blocks are slidably mounted in segmental guide channels 10 mounted in fixed supports 10ª concentrically to the axes of the hollow pivots 5 between the sides of the frames and the ends of the roller 8.

In each guide channel 10 between one end thereof and the bearing block 7 is mounted a coiled spring 11, which springs oppose the effect of the pressure by the blank on the roller 8 as hereinafter described.

The saw 12 passes through the hollow pivots 5, being guided by two wheels 13 and 14 mounted in the frame 6 in such a way that each of the wheels touches one side of the saw blade.

The wheel 13 has an upright flange serving as a support for the rear edge of the saw. The saw guide acts automatically in the following way:

The material is fed forward between the two rollers 2 and 4.

The saw guide is placed in such a position, that the top of the roller 8 is on a level with the top of the roller 2, and as close to this roller as possible.

The roller 4, which presses the material down against the roller 2 feeds the blank ahead between the roller 8 and a spring actuated roller 16, mounted in the upper part of the frame 6.

As the saw blade 12 has a constant distance from its roller 8, it will cut off from the blank a ribbon with a thickness equal to the distance between the saw and the roller 8. If now a convex unevenness occurs on the blank, this unevenness will press against the roller 8. If the roller can not give way on account of vertical pressure, the convex unevenness will push the roller ahead as the material is fed forward. But as the bearing 9 of the roller 8 is movable only in the segmental guide, this pushing ahead will turn out as a turning movement around the hollow pivot 5. The spring 11 will oppose the pushing and stop this the moment the unevenness of the blank has got its point of contact at the top of the roller 8. The pushing force will then cease, and the blank will slide ahead on the roller 8. As the shaft of the roller 8 is resting in the frame 6 and beside this the wheels 13 and 14 are also resting in the frame, which is movable around its pivot 5, the wheels 13 and 14 will turn the saw in such a way, that it will always be parallel to the axis of the roller 8. Accordingly the distance between the saw 12 and the roller 8 will not be changed, and the teeth of the saw will have the same cutting direction as the direction of the lower edge of the material at the point of contact.

If now the convex unevenness passes and is replaced by a concave one, the spring 11 will push the shaft of the roller 8 ahead, as shown on Fig. 2, until the point of contact of the blank has reached the top of the roller 8. But at the same time as the roller 8 swings forward, the saw 12 too is turned by the wheels 13 and 14, in such a way that the teeth of the saw get the same cutting direction as the direction of the lower edge of the material which is in contact with the roller 8.

The position of the saw will accordingly at all times be directed by the unevenness of the blank successively as this moves over the top of the roller 8.

Fig. 3 shows the saw guide in the moment the saw is cutting a straight part of the material. One saw guide as described is arranged on each side of the blank, as shown on Fig. 4. 17 is the cut off hoop. The dotted line 18 shows the course of the saw.

I claim:

1. A band saw guide for cutting blanks of irregular shape, comprising guide members for the saw blade, hollow pivots on which said members swing and through which the saw blade extends, and means to swing the guide members against the action of the blank, whereby the saw will follow the longitudinal contour of the blank.

2. A band saw guide for cutting blanks of irregular shape, comprising guide members for the saw blade, hollow pivots on which said members swing and through which the saw blade extends, and means contacting with the blank and actuated by the irregularities thereof, which swing the guide members, whereby the saw will follow the longitudinal contour of the blank.

3. A band saw guide comprising guide frames for the saw, hollow pivots on which the frames swing and through which the saw extends, guide rollers mounted on the frames adapted to engage the blank being sawed, and means to move the rollers against the action of the blank on the latter.

4. A band saw guide comprising two sets of guide rollers engaging the saw blades on opposite sides of the blank, frames carrying the guide rollers, hollow pivots on which said frames swing and through which the saw extends, a roller rotatably mounted between said frames on one side of the blank, and a spring actuated roller mounted between the frames for pressing the blank against said rotatable roller.

5. A band saw guide comprising two sets of guide rollers engaging the saw blade on opposite sides of the blank, spring actuated frames carrying the guide rollers, hollow pivots on which said frames swing and through which the saw extends, a roller rotatably mounted between said frames on one side of the blank, and a spring actuated roller mounted between the frames for pressing the blank against said rotatable roller.

6. A band saw guide comprising two sets of guide rollers engaging the saw blade on opposite sides of the blank, frames carrying the guide rollers, hollow pivots on which said frames swing and through which the saw extends, a roller rotatably mounted between said frames on one side of the blank, a spring actuated roller mounted in said frames on the opposite side of the blank, segmental stationary guide channels mounted on opposite sides of the blank and springs in said channels for moving said rotatable roller against the action of the blank on the latter.

In testimony that I claim the foregoing as my invention, I have signed my name in presence of two subscribing witnesses.

ALBERT LIEN.

Witnesses:
VIDKUNN JOHNSEN,
REINERT LEIN.